Figure 1:
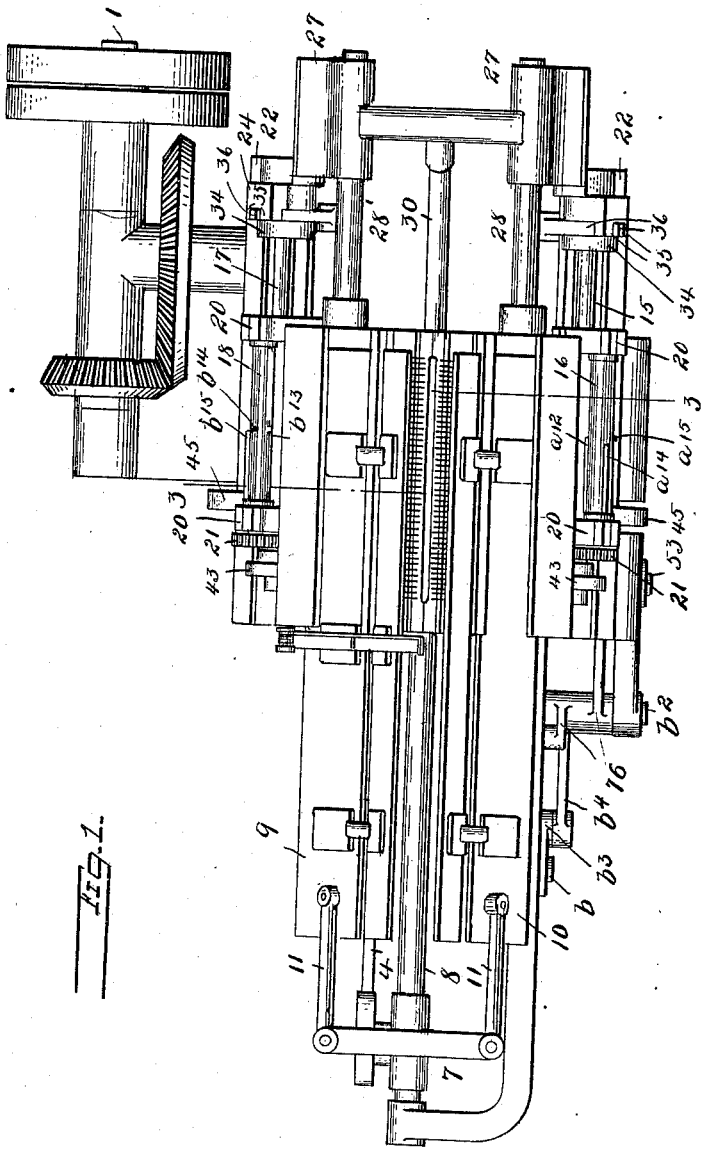

No. 663,900.　　　　　　　　　　　　　　　　　Patented Dec. 18, 1900.
H. A. HOUSEMAN.
STRAIGHT KNITTING MACHINE.
(No Model.)　　　　(Application filed Mar. 13, 1900.)

9 Sheets—Sheet 1.

WITNESSES:
Jesse B. Heller
J. M. Shindler Jr.

INVENTOR
Harry A. Houseman
BY
Harding & Harding
ATTORNEYS

No. 663,900. Patented Dec. 18, 1900.
H. A. HOUSEMAN.
STRAIGHT KNITTING MACHINE.
(Application filed Mar. 13, 1900.)
(No Model.) 9 Sheets—Sheet 2.

WITNESSES:

INVENTOR
Harry A. Houseman
BY
Harding & Harding
ATTORNEYS

No. 663,900. Patented Dec. 18, 1900.
H. A. HOUSEMAN.
STRAIGHT KNITTING MACHINE.
(Application filed Mar. 13, 1900.)

(No Model.) 9 Sheets—Sheet 3.

WITNESSES:
INVENTOR
Harry A. Houseman
BY
Harding & Harding
ATTORNEYS

No. 663,900.  
H. A. HOUSEMAN.  
STRAIGHT KNITTING MACHINE.  
(Application filed Mar. 13, 1900.)

Patented Dec. 18, 1900.

(No Model.)

9 Sheets—Sheet 4.

WITNESSES:
Jesse B. Heller
J. M. Shindler Jr.

INVENTOR
Harry A. Houseman
BY
Harding & Harding
ATTORNEYS

No. 663,900. Patented Dec. 18, 1900.
H. A. HOUSEMAN.
STRAIGHT KNITTING MACHINE.
(Application filed Mar. 13, 1900.)
(No Model.) 9 Sheets—Sheet 5.
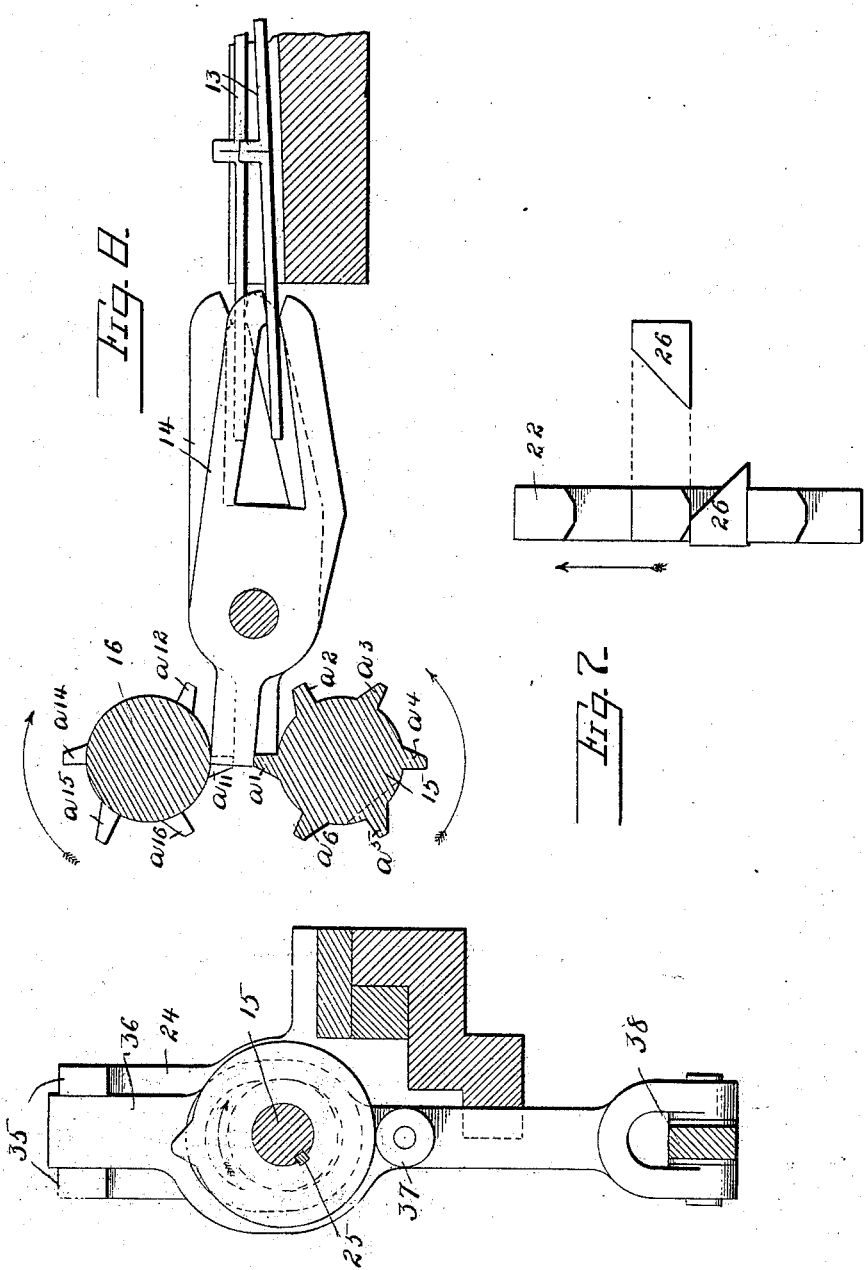
WITNESSES:
INVENTOR
BY
ATTORNEYS No. 663,900. Patented Dec. 18, 1900.
H. A. HOUSEMAN.
STRAIGHT KNITTING MACHINE.
(Application filed Mar. 13, 1900.)
(No Model.) 9 Sheets—Sheet 6.
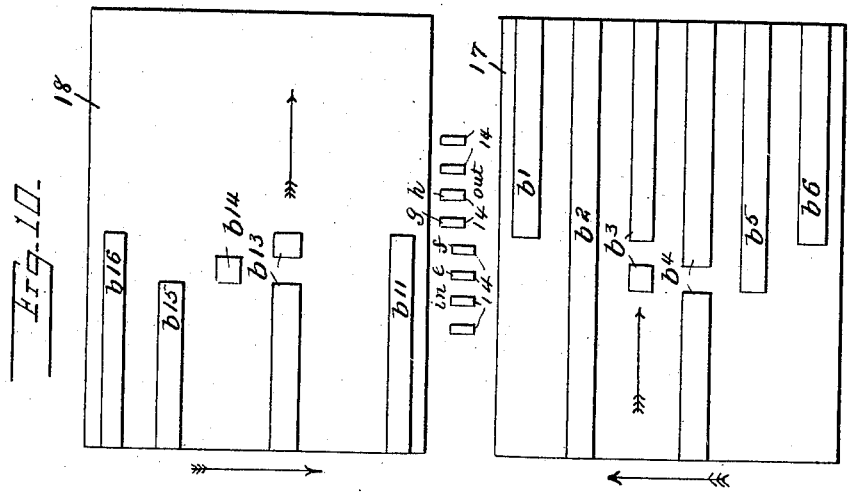
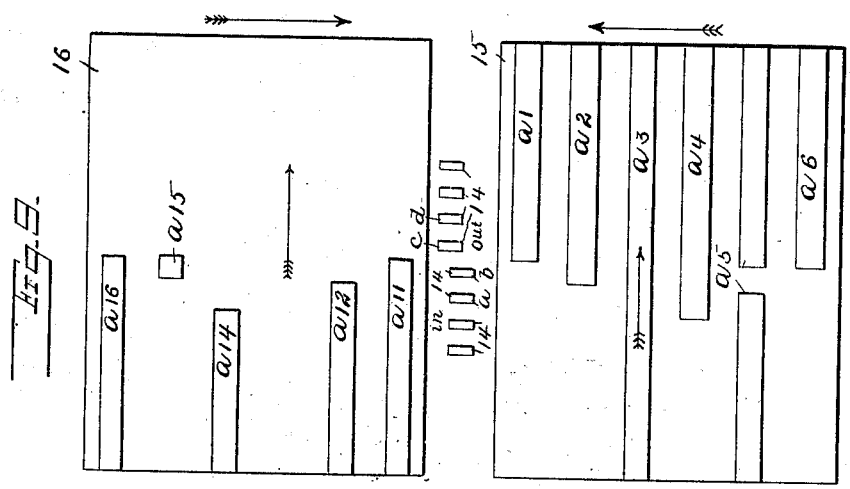
WITNESSES:
INVENTOR No. 663,900. Patented Dec. 18, 1900.
H. A. HOUSEMAN.
STRAIGHT KNITTING MACHINE.
(Application filed Mar. 13, 1900.)
(No Model.)
9 Sheets—Sheet 7.

WITNESSES:
Jesse B. Heller,
J. M. Shindle Jr.

INVENTOR
Harry A. Houseman
BY
Harding & Harding
ATTORNEYS

No. 663,900. Patented Dec. 18, 1900.
H. A. HOUSEMAN.
STRAIGHT KNITTING MACHINE.
(Application filed Mar. 13, 1900.)
(No Model.) 9 Sheets—Sheet 8.
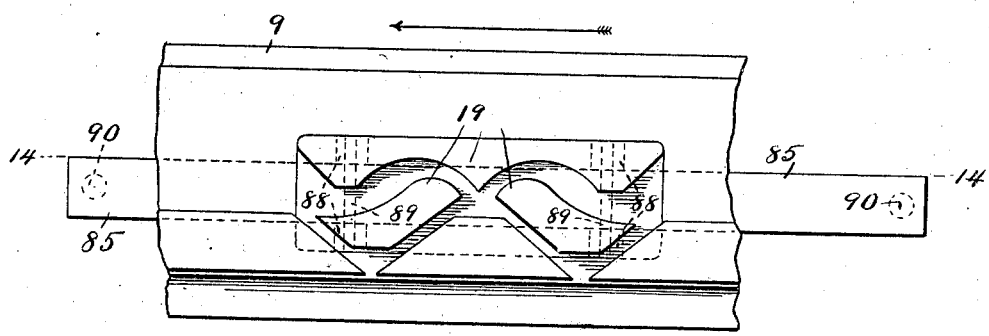
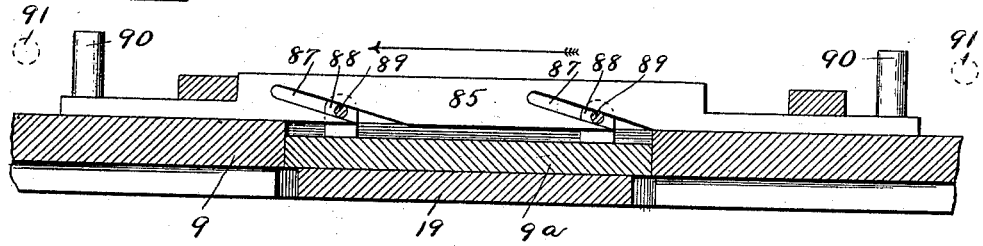
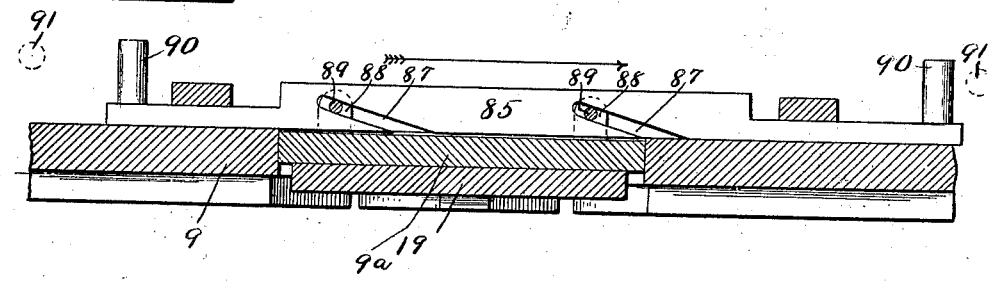
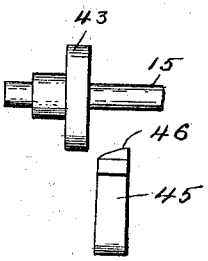
WITNESSES:
Jesse B. Neller
J. M. Shindlee Jr.
INVENTOR
Harry A. Houseman
BY Harding & Harding
ATTORNEYS No. 663,900. Patented Dec. 18, 1900.
H. A. HOUSEMAN.
STRAIGHT KNITTING MACHINE.
(Application filed Mar. 13, 1900.)
(No Model.) 9 Sheets—Sheet 9.

WITNESSES:
Jesse B. Heller
J. M. Shindler Jr.

INVENTOR
Harry A. Houseman
BY
Harding & Harding
ATTORNEYS

UNITED STATES PATENT OFFICE.

HARRY A. HOUSEMAN, OF PHILADELPHIA, PENNSYLVANIA, ASSIGNOR TO THE STANDARD MACHINE COMPANY, OF PENNSYLVANIA.

STRAIGHT-KNITTING MACHINE.

SPECIFICATION forming part of Letters Patent No. 663,900, dated December 18, 1900.

Application filed March 13, 1900. Serial No. 8,427. (No model.)

*To all whom it may concern:*

Be it known that I, HARRY A. HOUSEMAN, a citizen of the United States, residing at Philadelphia, county of Philadelphia, and State of Pennsylvania, have invented a new and useful Improvement in Straight-Knitting Machines, of which the following is a full, clear, and exact description, reference being had to the accompanying drawings, which form a part of this specification.

My invention relates to straight-knitting machines, and more particularly to machines for knitting fashioned tubular goods.

It consists in novel means for dictating what needles are to be thrown into or out of operation at each round of knitting, so as to produce the fashioned fabric and for throwing said needles into and out of operation; in novel means for dictating and actuating the needles of each bank that are to be thrown into action to knit with the needles of the opposite bank for the purpose of making the cross-stitching to close up the holes that would otherwise be formed by the throwing in and out successively of the fashioning-needles to produce the fashioned fabric; in novel means for throwing into action and actuating the needle controlling and actuating mechanism; in a special construction of longitudinally movable and rotatable rolls for dictating the needles to be thrown into and out of operation and the order in which they are to be thrown into and out of operation and for actuating them accordingly; in a novel arrangement of cam and cam-plates for imparting to said rolls their desired movement of rotation and for actuating mechanism to shift said rolls longitudinally; in novel mechanism directly acting upon the rolls to shift them longitudinally; in novel means for throwing into operation and actuating said cam and cam-plates; in novel means for throwing the roll-shifting mechanism out of operation and for shifting the rolls back to their initial position when the desired length of fabric has been knit; in a special knitting device for holding the rolls from being shifted to their initial position after the mechanism for shifting the rolls forwardly has been disengaged and until the rolls have completed a definite movement of rotation; in a novel pawl-and-ratchet mechanism for throwing the roll shifting and turning mechanism into position to be actuated; in novel mechanism directly controlled by the pattern mechanism for holding out of action and throwing into action said pawl-and-ratchet mechanism; in a novel pattern mechanism, a novel construction of pattern-drum, and novel actuating mechanism therefor; in a special construction of pattern-drum, and in various novel combinations of mechanism and novel constructions and arrangements of particular parts, all of which is hereinafter particularly described, and pointed out in the claims.

Figure 2:
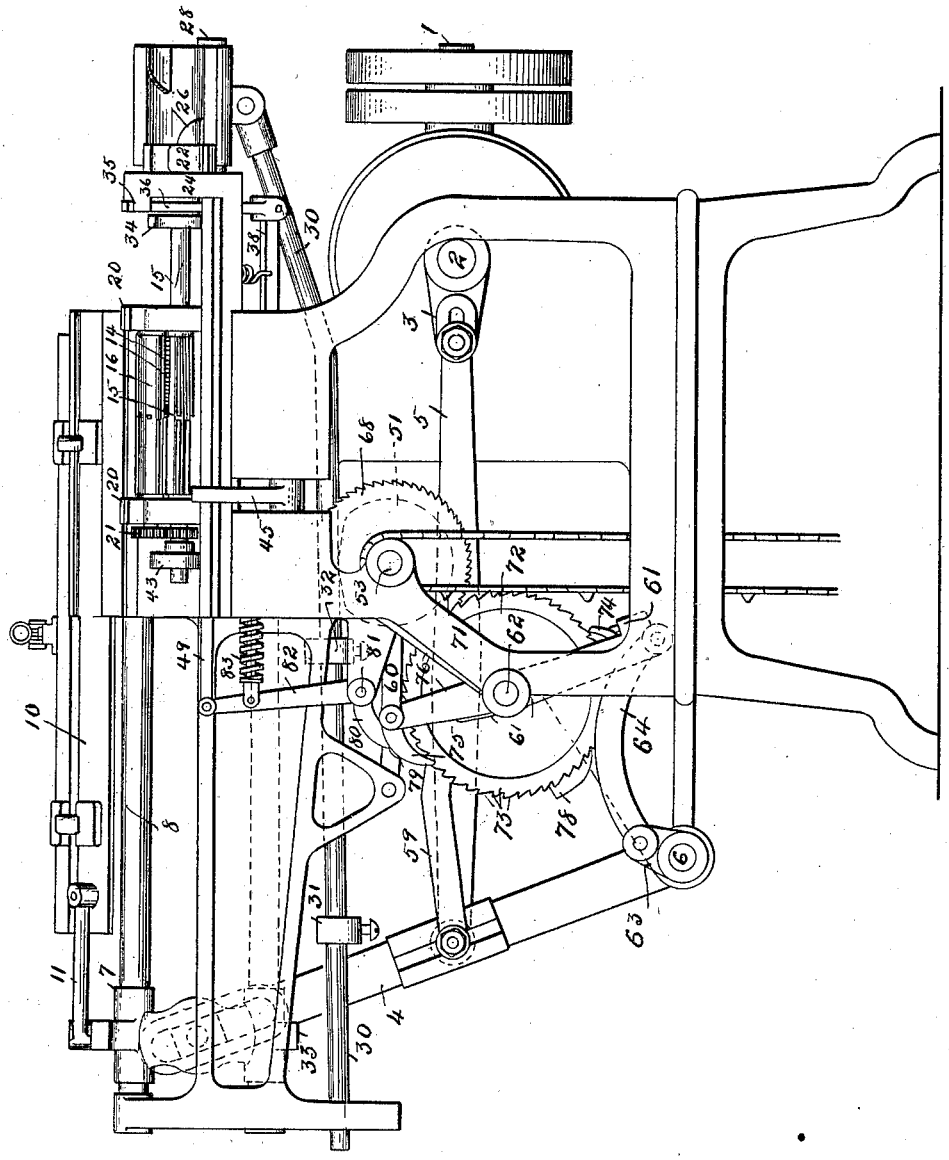
Figure 3:
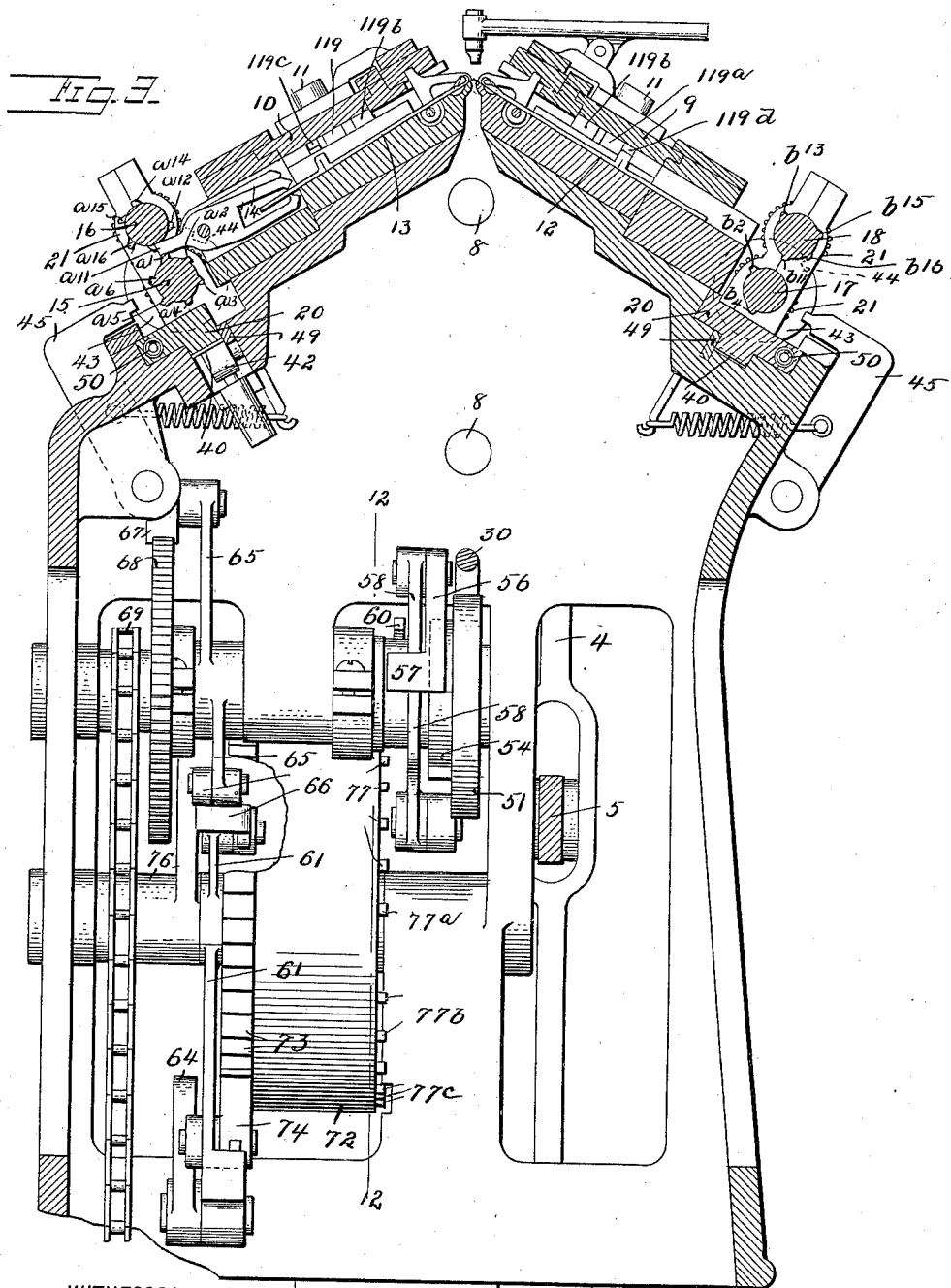
Figure 4:
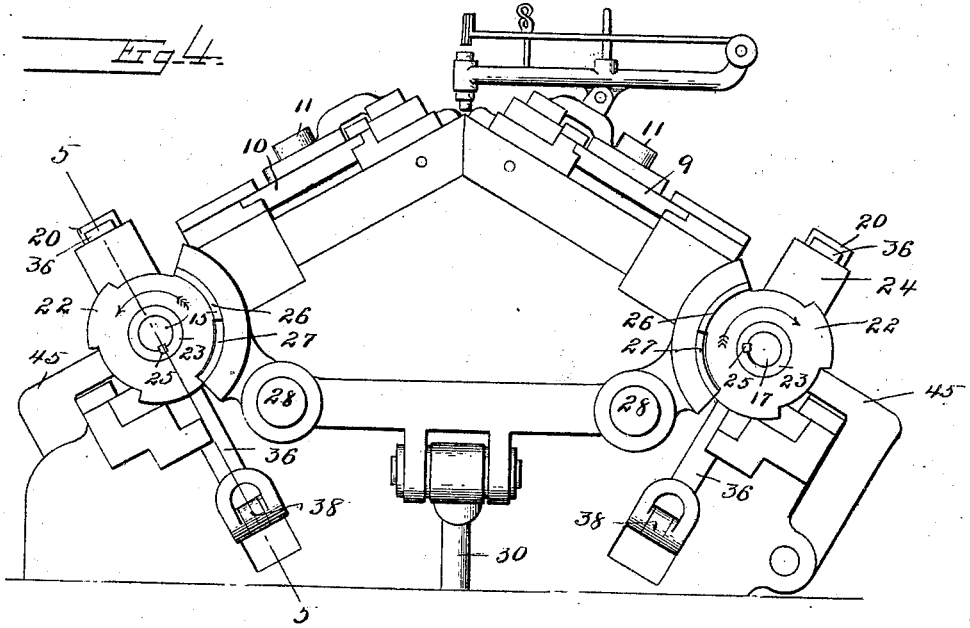
Figure 5:
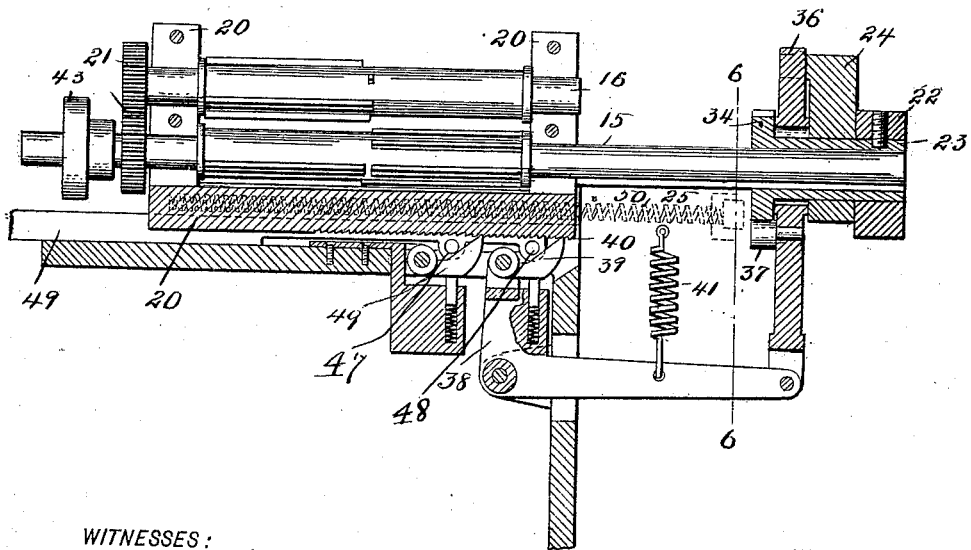
Figure 11:
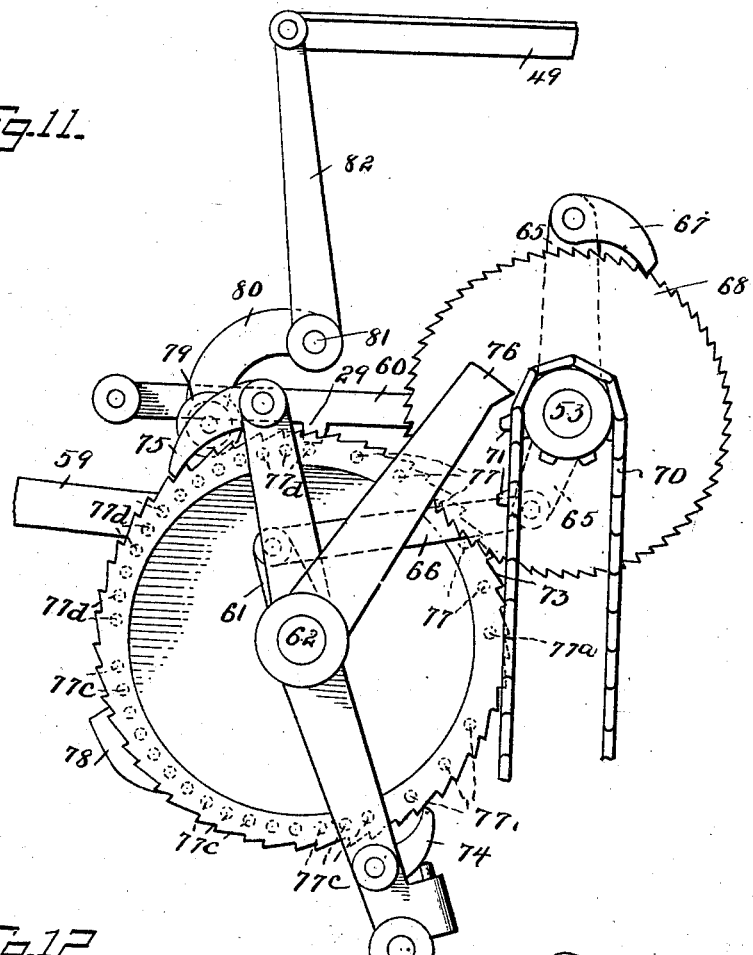
Figure 12:
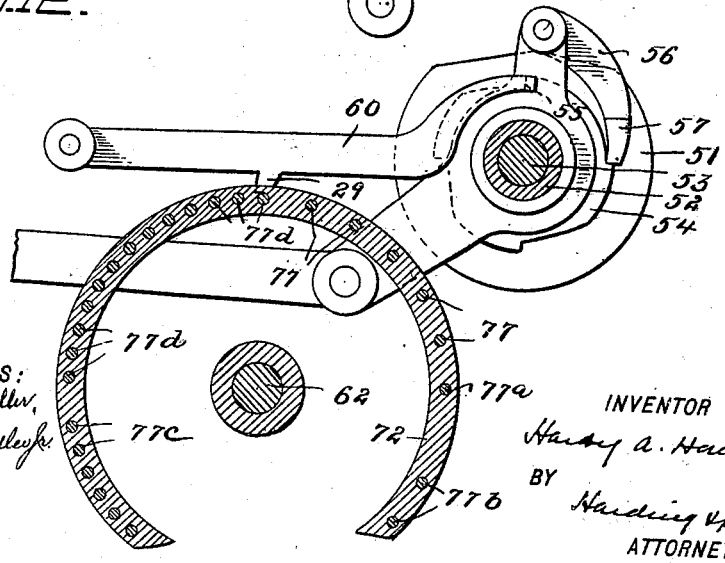
Figure 16:
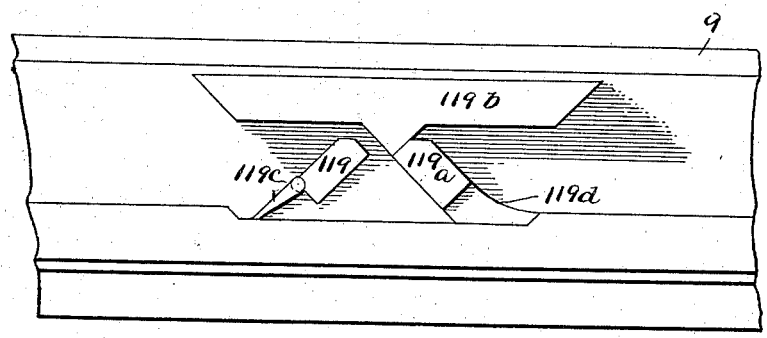
Figure 17:
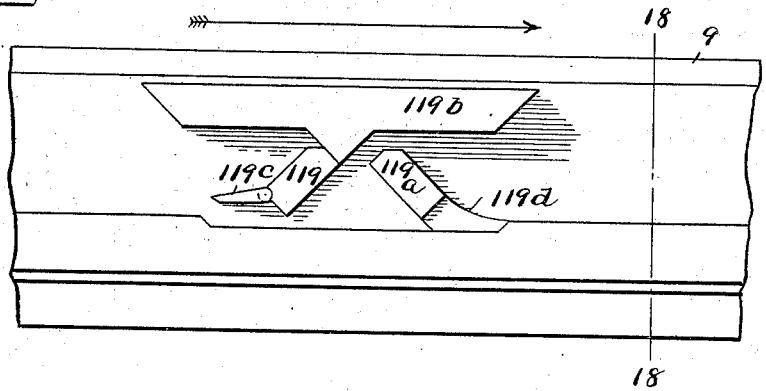
Figure 18:
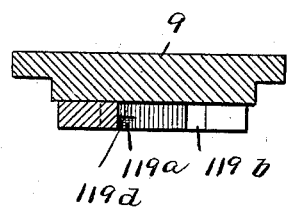

Figure 1 is a plan view. Fig. 2 is a side elevation. Fig. 3 is a transverse section on the line 3 3 of Fig. 1. Fig. 4 is a partial end view. Fig. 5 is a detail section on the line 5 5 of Fig. 4, showing pattern-rolls and actuating mechanism therefor. Fig. 6 is a section on the line 6 6 of Fig. 5. Fig. 7 is a diagram of the cam for operating the needle-lever-controlling rolls. Fig. 8 is an enlarged detail sectional view of the needle-lever-controlling rolls, a needle, and a portion of the needle-bed. Fig. 9 is a diagram of the needle-lever-controlling rolls for the front bank of needles. Fig. 10 is a diagram of the needle-lever-controlling rolls for the rear bank of needles. Fig. 11 is a side elevation of the pattern-cylinder and its controlling mechanism. Fig. 12 is a detail section on the line 12 12 of Fig. 3. Fig. 13 is an inverted plan of one of the needle-cams. Figs. 14 and 14$^a$ are sections through the same on the line 14. Fig. 15 is a detail view of the slide-locking device. Fig. 16 is a plan view of a modified form of one of the cam-plates and the knitting-cam, showing the cams as they are when knitting with a full bank of needles. Fig. 17 is a plan view of the same when one needle of the bank is knitting with the needles of the other bank. Fig. 18 is a section on line 18 18, Fig. 17.

1 is the main driving-shaft, and 2 the crank-shaft driven thereby through the medium of the bevel-gears.

3 is the crank, and 4 the rocking lever, which is connected to crank 3 by means of connecting-rod 5. The rocking lever 4 is connected at one end to the shaft 6 and at the other end to the cross-head 7, which reciprocates on the rods 8.

9 and 10 are the knitting-cam plates, which are connected to the cross-head 7 by means of the links 11.

12 and 13 are the needles. The needles 12 are the regular needles used on every round of knitting, and 13 are the fashioning-needles. The needles 13 are raised into and out of alinement with the knitting-cams by means of the pivoted needle-levers 14. The needle-levers of the front bank are controlled by the rolls 15 and 16, while the needle-levers of the rear bank are controlled by the rolls 17 and 18. These two pairs of rolls have a longitudinal movement and a rotary movement, the longitudinal movement setting the rolls to control additional fashioning-needles one at a time and the rotation of the rolls dictating the fashioning-needles to be thrown into and out of action at each reciprocation in order to make the cross-stitching to close up the hole produced by the throwing in of an additional needle, the operation broadly being the same as that described in the specification of Frank Wilcomb, Serial No. 712,976, filed April 14, 1899. The construction of these rolls, their operation, and the method by which they control the fashioning-needle levers will first be described and afterward the actuating mechanism for imparting to the rolls the described movements.

Referring now to Figs. 8, 9, and 10, 15 is the lower roll, and 16 the upper roll, of the pair of rolls for controlling the front bank of fashioning-needles, and 17 is the lower roll, and 18 the upper roll, of the pair of rolls for controlling the rear bank of fashioning-needles. The roll 15 is provided with six projections $a'$ $a^2$ $a^3$ $a^4$ $a^5$ $a^6$, extending longitudinally on its periphery and of varying length, while the roll 16 has five projections $a^{11}$ $a^{12}$ $a^{14}$ $a^{15}$ $a^{16}$ of the same character. These projections impart to the needle-levers the necessary pivoted movement to bring them into and out of alinement with the needle-cam. The two rolls rotate in unison in opposite directions, so that projections $a'$, for example, will always aline with projections $a''$, each of these projections, however, registering with the cut-away portion of the other projection—that is, each projection of each roll with the cut-away portion of the other roll which is in alinement with the corresponding projection of that other roll. In this way projections $a^2$ aline with projection $a^{12}$, $a^4$ with $a^{14}$, $a^5$ with $a^{15}$, and $a^6$ with $a^{16}$. The projection $a^{15}$ of upper roll 16 is higher than the other projections in order to tilt the single needle-levers which at any one time it controls a sufficient distance to throw the corresponding needle into alinement with the knitting-cam 19 in the cam-plate 10, so that this needle will knit with the rear bank of needles. 17 is the lower roll, and 18 the upper roll, of the pair of rolls for controlling the rear bank of fashioning-needles. The roll 17 is provided with six projections $b'$ $b^2$ $b^3$ $b^4$ $b^5$ $b^6$ and the roll 18 with five projections $b^{11}$ $b^{13}$ $b^{14}$ $b^{15}$ $b^{16}$, these projections being of the same character as those upon the rolls 15 and 16, the projection $b^{14}$ being higher than the other projections. The projection $b'$ in the rotation of the rolls alines with projection $b^{11}$, $b^3$ with $b^{13}$, $b^4$ with $b^{14}$, $b^5$ with $b^{15}$, and $b^6$ with $b^{16}$, in the same manner as on the pair of rolls 15 and 16. I shall now describe the operation of these rolls and the way in which they act to throw in and out additional fashioning-needles, as desired. I shall describe the way in which these fashioning-needles are actuated by the specific rolls illustrated, although it will be understood that these needles may be actuated in any other predetermined way by a different form and arrangement of projections on the rolls.

Assuming the rolls to be in the position shown in Figs. 8, 9, and 10, the projections $a^{11}$ and $b^{11}$ have thrown four of the needles of each bank into action, while the projections $a'$ and $b'$ are holding four of the needles of each bank out of action. The thread-carrier and the knitting-cams now travel from right to left, knitting on the rear bank of needles. At the end of this throw the rolls are rotated a one-sixth turn, so that projections $a^2$ and $a^{12}$ are in contact with the needle-levers of the front bank and projection $b^2$ is in contact with the needle-levers of the rear bank. This described rotation of the rolls 15 and 16 will throw the needle-lever marked $b$, Fig. 9, out of action, and rolls 17 and 18 will throw all the needles of the rear bank out of action—that is, throw all of the fashioning-needles on a common level—so as to permit of the subsequent longitudinal shifting of the rolls. The thread now travels from left to right, knitting on the front bank of needles, and the rolls controlling the rear bank of needles are shifted longitudinally in the direction of the arrow a distance equal to the distance between needles. Both pairs of rolls are now rotated another one-sixth turn, bringing projection $a^3$ in contact with the needle-levers of the front bank and projections $b^3$ and $b^{13}$ in contact with the needle-levers of the rear bank. This described rotation of the rolls 15 and 16 will throw all the needles of the front bank out of action—that is, throw all the fashioning-needles on a common level— so as to permit of the subsequent longitudinal shifting of the rolls, and the rolls 17 and 18 will throw needle-lever $g$ into action and lever $f$ out of action, Fig. 10. The thread-carrier now travels from right to left, knitting on the rear bank of needles, and the rolls controlling the front bank are shifted longitudinally in the direction of the arrow a distance equal to the distance between needles. Both pairs of rolls are now given another one-sixth turn, bringing projections $a^4$ and $a^{14}$ in contact with the needle-levers of the front bank and projections $b^4$ and $b^{14}$ in contact with the needle-levers of the rear bank. This will keep needle-lever $a$ in action and keep needle-lever $b$ out of action and will throw needle-lever $f$ of the rear bank into action, so as to cross the thread from the front bank of needles to the rear bank and so that the corresponding needle will knit with the front bank of needles. The thread-carrier now travels from left to right, knitting on the front bank of needles and needle $f$ of the rear bank. Both pairs of rolls are now given another one-sixth turn, bringing projections $a^5$ and $a^{15}$ in contact with the needle-levers of the front bank and projections $b^5$ and $b^{15}$ in contact with the needle-levers of the rear bank. This will throw needle-lever $f$ out of action and needle-lever $e$ into action and will throw needle-lever $c$ of the front bank into action, so as to cross the thread from the rear bank to the front bank and so that the corresponding needle will knit with the rear bank of needles. The thread-carrier now travels from right to left, knitting on the rear bank and needle $c$ of the front bank. Both pairs of rolls are now given another one-sixth turn, bringing the projections $a^6$ and $a^{16}$ in contact with the needle-levers of the rear bank. This will maintain in action needle-lever $c$ of the front bank. The thread-carrier now travels from left to right, knitting on the front bank. The pairs are now given another one-sixth turn, returning all the rolls to their initial position. So long as the rolls are held in this position five needles, including needle $c$ of the front bank, and five needles, including needle $g$ of the rear bank, will be in action. When another needle is to be thrown into action, the rolls will be again rotated and shifted longitudinally one point, as before described.

I shall now describe the mechanism for actuating the rolls.

The rolls are journaled in a frame or slide 20, each of the rolls 15 and 17 being directly actuated and geared, respectively, to the rolls 16 and 18. I shall describe only the mechanism for operating roll 15, it being understood that the mechanism for actuating roll 17 is a duplicate of that for operating roll 15.

22 is a cam having three projections and secured to the sleeve 23, journaled in a bearing 24.

25 is a spline working in a groove in the sleeve 23, so as to connect the shaft of roll 15 with sleeve 23, so that the shaft will rotate with the sleeve, but may move longitudinally independent of the sleeve.

26 represent two cam-plates beveled on one side, secured to the cross-head 27, which is reciprocated on the rods 28. At one throw of the cross-head the beveled portion of upper cam-plate 26 is thrown into engagement with one of the projections of cam 22, giving the sleeve and roll 15 a one-sixth turn, and on the return throw of the cross-head the beveled portion of lower cam-plate 26 is thrown into engagement with the next succeeding projection of cam 22, giving the sleeve and roll 15 another one-sixth turn. The cam is prevented from turning more than one-sixth turn at each engagement of a cam-plate by reason of the engagement of the non-beveled side of the cam-plate with the projection immediately behind the one engaged by the beveled side, and during the withdrawal of either cam-plate the cam is held from further advanced rotation by the continuous engagement of the non-beveled side of the cam-plate with the cam, such cam-plate being timed to wholly disengage itself from the cam only when the beveled portion of the other cam-plate has moved into position to engage and advance the cam another step. This cross-head actuates the roll 17 by means of a duplicate set of cam-plates, cams, &c. I will now describe the mechanism for operating the cross-head 27.

The cross-head 27 is connected to one end of the rod 30. To the other end of the rod are secured two adjustable stops or projections 31 and 32.

33 is a lug connected to the lower end of the cross-head 7.

When it is desired to operate the cross-head 27, (for the purpose of actuating the rolls to add additional needles, as before described,) the rod 30 is elevated, so as to bring the lugs 31 and 32 into alinement with the lug 33 on the constantly-reciprocating cross-head 7 at a time in the operation of the cross-head when the lug 33 is between the lugs 31 and 32, and in moving from right to left the lug 33 will strike the lug 31, moving the rod 30 and cross-head 27 from right to left, (thus giving the roll a one-sixth turn, as before described.) On the return throw of cross-head 7 the lug 33 will strike lug 32, moving the rod 30 and cross-head 27 from left to right, (thus giving the rolls another one-sixth turn, as before described.) The reciprocation of cross-head will reciprocate cross-head 27 until the rod 30 is lowered to its normal position.

I will now describe the mechanism for shifting the rolls 15 and 16 longitudinally at one point in the complete rotation of the rolls, as before described.

Secured to the sleeve 23 is the cam 34. Sliding on the sleeve 23 and between the projection 35 on the bearing 24 is the bar 36, having the roller 37. The bar 36 is connected to one arm of the bell-crank 38, the other arm of this bell-crank carrying the pawl 39, working in the rack 40 on the slide 20. By referring to Figs. 5 and 6 it will be understood that when the raised part 34' strikes the roller 37 it will depress bar 36, turn bell-crank 38, and cause pawl 39 to advance the slide 20 the distance of one tooth.

41 is a spring for returning the bell-crank 38 and bar 36 to normal position, bringing the pawl 39 back to engage the next tooth.

42 is a retaining-pawl.

The mechanism for shifting longitudinally rolls 17 and 18 is a duplicate of that just described for shifting rolls 15 and 16.

After all the fashioning-needles have been thrown into action and the required length of wide fabric has been knit and it is desired to throw all the fashioning-needles out of action, so as to start on the narrow goods, I provide the following mechanism for returning the rolls to their initial position: On the shaft of rolls 15 is the cam 43, having the cut-away portion 44. Pivoted to the frame of the machine is the lever 45. After all the fashioning-needles have been thrown into action and the roll 15 has moved to the extreme right (see Figs. 2 and 3) the cam 43 will have passed beyond the lever 45. It should be stated at this point that cam 43 in its forward movement has been enabled to pass beyond lever 45 by reason of an inclined surface 46 on the lever 45. (See Fig. 15.) When, however, the cam 43 has passed beyond lever 45, it will be engaged by the lever 45 and the slide will be prevented from returning until the cam has been rotated, so that the cut-away portion 44 thereof will aline with lever 45. To return the slide, the pawls 39 and 42 are disengaged from the rack 40 by means of pins 47 and 48 on bar 49, (see Fig. 5,) whereupon the spring 50 returns the slide to its initial position as soon as the rolls 15 and 16 and cam 43 have been rotated, so that the cut-away portion 44 of the cam alines with lever 45. The slide carrying rolls 17 and 18 is returned to its initial position by mechanism like that just described for returning the slide carrying rolls 15 and 16.

I will now describe the mechanism for lifting the rod 30.

51 is a cam on a sleeve 52 on the shaft 53. This cam has a concentric portion and a cut-away portion, the rod 30 resting on the cut-away portion when no additional fashioning-needles are being thrown into action. This sleeve also carries the four-toothed ratchet 54, the top of tooth 55 being concentric with the bottom of each of the other teeth.

56 is a pawl having the lug 57 and pivoted to the bell-crank 58, connected by means of the link 59 with the rocking lever 4.

60 is a pivoted guard-lever the upturned end of which is very slightly higher than the top of tooth 55. The pawl 56 being positively connected with the rocking lever 4 is being constantly reciprocated; but so long as the end of guard-lever 60 is elevated the pawl cannot engage the tooth 55 and the cam remains stationary. When it is desired to raise the rod 30 to actuate the mechanism to throw in an additional fashioning-needle, as before described, the guard-lever 60 is caused to be dropped by the pattern mechanism, to be hereinafter described, permitting the pawl 56 to engage the tooth 55, turning the cam a quarter-turn, elevating the rod 30, and bringing the lugs 31 and 32 in alinement with the lug 33, as before described. This turning of the cam and lifting of rod 30 is timed to occur as the thread-carrier moves from right to left, and just before the cam has completed its first quarter-turn the lug 33 strikes lug 31, giving the needle-lever-controlling rolls their first one-sixth turn. Just before the pawl has retreated to engage the next tooth of the series lug 33 strikes lug 32, giving the needle-lever-controlling rolls their second one-sixth turn. The rolls are thus given a complete rotation by the pawl 56 engaging successive teeth of the ratchet. If it is desired that the rolls should rotate but once, the guard-lever 60 will have elevated immediately after the ratchet has been given its first quarter-turn, so that it will be in a position to render the pawl ineffective after it has engaged the other three teeth of the ratchet 54, and thereby held the rod 30 in its elevated position a sufficient time to give the rolls a complete rotation.

The pattern mechanism for lowering and raising the guard-lever 60 will now be described.

61 is a rocking lever on the shaft 62. Connected to one end of this rocking lever and to a crank 63 on the shaft 6 is a link 64, thereby giving to the rocking lever 61 a constantly-reciprocating motion.

65 is a rocking lever on the shaft 53, connected to the rocking lever 61 by means of the link 66, this rocking lever being thereby also constantly reciprocated.

67 is a pawl on the rocking lever 65, working in the ratchet 68 on the shaft 53. Connected to this ratchet-wheel is a sprocket-wheel 69, carrying the pattern-chain 70, having the lugs 71.

72 is the pattern-drum having the ratchet 73, having the alternate long and short teeth.

74 is a pawl on the rocking lever 61.

75 is a pawl on one arm of the bell-crank 76, the other arm being in line with the lugs 71 on the pattern-chain. The pawl 74 on the constantly-reciprocating rocking lever 61 normally plays on one of the long teeth of the pattern-drum ratchet, the stroke not being sufficient to carry it beyond the long tooth. The pawl 75 is in engagement with the ratchet 73, but is normally inactive. Arranged on the side of the pattern-drum close to its periphery is a succession of pins 77, which normally hold the guard-lever 60 in its elevated position.

When it is desired to drop the guard-lever 60 to throw into action the mechanism for adding an additional fashioning-needle, it is necessary to rotate the pattern-drum a sufficient distance to allow the projection 29 on guard-lever 60 to drop back of the tooth upon which it has been resting. This is accomplished by the following operation of the mechanism just described: The bell-crank 76 is struck by one of the lugs 71 on the pattern-chain, rocking the bell-crank and advancing the pattern-drum by means of pawl 75 a sufficient distance to permit the pawl 74 in its next reciprocation to ride beyond and engage the long tooth upon which it has been playing, advancing the pattern-drum a distance sufficient to carry the pin 77 from under the projection 29, and permitting the guard-lever 60 to drop. At the next reciprocation of the pawl 74 it engages a short tooth, shifting the pattern a sufficient distance to bring the next pin against and under the projection 29, lifting the guard-lever 60. The lever 60 remains in its elevated position until the next lug on the pattern-chain strikes the bell-crank 76, thereby again causing the drum to rotate and the guard-lever 60 to be raised and lowered, as before. The guard-lever 60 is thus intermittently raised and lowered at periods determined by the lugs on the pattern-chain until the projection 29 drops back of the pin $77^a$. When projection 29 drops back of pin $77^a$, the turning of the pattern-drum by means of pawl 74 will not advance the drum a sufficient distance to cause the next succeeding pin $77^b$ to engage the projection 29. Until the next lug of the pattern-chain strikes the bell-crank 76 the guard-lever 60 will remain down, causing the rotation of the cam 51 to be repeated a predetermined number of times, thereby throwing in successively a predetermined number of additional fashioning-needles. When this next lug on the pattern-chain strikes the bell-crank 76, the pawls 75 and 74 will be operated, as before described, thereby rotating the drum to bring the first of the pins $77^b$ under the projection 29, lifting the guard-lever 60, thereby stopping the cam 51 when it has completed its revolution. The guard-lever 60 is then intermittently raised and lowered at periods determined by the lugs on the pattern-chain until the projection 29 is raised by the first pin of the series of pins $77^c$. All the fashioning-needles have now been thrown into action. The pins $77^c$ are sufficiently close together to prevent the projection 29 from dropping between them, and there are just a sufficient number of remaining lugs on the pattern-chain, arranged indifferently, to rotate the drum until the projection 29 drops back of the last pin of the series of pins $77^c$. From the time that the projection 29 has been raised by the first pin of the series of pins $77^c$ until it has dropped back of the last pin of the series all of the fashioning-needles are retained in action.

I provide the following mechanism for shifting the pawl-releasing bar 49 in order to release the pawls 39 and 42 to permit the return of the roll-carrying slides 20, as before described. Just before the projection 29 drops back of the last pin of the series of pins $77^c$ the cam projection 78 on the pattern-drum engages the roller 79 on the crank 80. This crank is secured to the shaft 81, to which is secured the levers 82, connected to the pawl-releasing bar 49. The engagement of cam projection 78 with roller 79 turns the crank 80, swinging the lever 82 and shifting the bars 49. The needle-lever-controlling rolls are then shifted longitudinally to their original position by means of the spring 50, as before described, throwing all the fashioning-needles out of action. The knitting on one section of tubular fabric is now completed and the knitting of the next section is at once commenced, the cam projections 78 at once passing beyond the roller 79 to permit the spring 83 to act to return the bar 49 to its original position, allowing the pawls 39 and 49 to reëngage the slide 20. The regular needles 12 only are in action and the desired length of narrow fabric is knit, during which the pattern-drum is rotated by means of lugs indifferently arranged on the pattern-chain until the projection 29 drops back of the last pin of the series of pins $77^d$, the operation then proceeding as before described.

It will be understood that either the lugs on the pattern-chain or the pins on the pattern-drum may be arranged in various ways to dictate the knitting of different styles of fashioned tubular goods and that by virtue of the employment of a pattern-drum in addition to the pattern-chain a comparatively short pattern-chain may be employed.

Referring now to Figs. 13, 14, and $14^a$, the knitting-cams 19 are secured to the portion $9^a$ of the cam-plate 9. This portion fits in an orifice in the plate 9 and can be moved toward and away from the needle-bed. In its movement toward the needle-bed it moves into alinement with the shanks of the needles and in its movement away from the needle-bed it is moved out of alinement with the needles, with the exception of the one which is elevated above the rest in order to knit with the opposite bank. This portion $9^a$ of the cam-plate 9 is moved toward and away from the needle-bed by the following mechanism: Mounted on the top of the cam-plate in suitable guides is the slidable bar 85, having the cam-slots 87. Projecting from the ends of the portion $9^a$ of the cam-plate 9 are the lugs 88. Passing through these lugs 88 and the cam-slots 87 are the pins 89. On the ends of the slidable bar 85 are the projections 90, in alinement with the stops 91 in the frame of the machine. Therefore as the cam-plate 9 passes from right to left the portion $9^a$ of the cam 9 and the knitting-cam 19 will be in the position shown in Figs. 13 and 14, knitting on the rear bank. As the projection 90 on the left hand of the bar 85 strikes its stop 91 after the cams have passed beyond the needle-bed, the rest of the movement of the cam-plate 9 will shift the bar 85 and elevate the portion $9^a$, carrying the knitting-cams out of alinement of all the needles with the exception of the one which is elevated above the rest by means of the projection $a^{15}$ or $b^{14}$. The bar now passes from left to right, (see Fig. $14^a$,) the cam-plate 10 knitting on the front bank. As soon as the projection 90 on the right-hand side of the bar 85 strikes the stop 91 the bar 85 will be shifted in the opposite direction, thereby moving the cams 19 into alinement with the needles. It will readily be understood that both sets of knitting-cams 19 are shifted at each half-round of the machine, one set into action and the other set out of action.

In Figs. 16, 17, and 18 I have shown a modified construction for acting upon the single needle, which is elevated above the rest by means of the projection $a^{15}$ or $b^{14}$, so as to cause it to knit with the needles of the other bank. 119, $119^a$, and $119^b$ are the regular knitting-cams, the latter being laterally slidable and being moved from left to right by the shanks of the needles striking it in the movement of the cam-plate from right to left. $119^c$ is a latch or switch cam secured to the end of cam 119, this switch-cam dropping by gravity into the position shown in Fig. 16, so as to direct the needles over the cam 119 as the cam-plate moves from right to left. In the reverse movement of the cam-plate all the needles except the one which it is desired shall knit with the opposite bank are just high enough to engage the cam $119^a$, but not high enough to engage cam $119^d$. These needles therefore pass underneath cam $119^a$ and are there rendered inactive. The needle of this bank which it is desired to throw into action is, however, raised just high enough to engage the edge of cam $119^d$ and is thereby caused to be elevated along with the needles of the opposite bank, passing over cam $119^d$, shifting cam $119^b$ from right to left, and passing underneath cam 119. This modification is somewhat simpler than the device shown in Figs. 13, 14, and $14^a$ and is for that reason preferable.

Having now fully described my invention, what I claim, and desire to protect by Letters Patent, is—

1. In a straight-knitting machine, the combination with the knitting-cams and the fashioning-needles, of devices for moving said needles independently into or out of operative position, a roll provided with a series of longitudinally-extending projections of varying extent, means for rotating said roll, one or more of said devices being in line of movement of one or more of said projections during the rotation of said roll and adapted to be moved thereby to throw said needles into or out of alinement with the knitting-cams, a frame for supporting said roll, and means for moving said roll longitudinally to dictate the needle-controlling devices to be actuated by said projections.

2. In a straight-knitting machine, the combination with the knitting-cams and the fashioning-needles, of devices for moving said needles independently into and out of operative position, a pair of rolls, each provided with longitudinally-extending projections and depressions of varying longitudinal extent, means for simultaneously rotating said rolls, the projections on one roll registering with the depressions on the other roll during rotation, said devices being in line of movement of the projections on one or the other of said rolls and adapted to be held or moved thereby to throw said needles independently into or out of alinement with the knitting-cams, and means for shifting said rolls longitudinally to dictate the needle-controlling devices to be actuated by the projections on each roll.

3. In a straight-knitting machine, the combination with the knitting-cams and the regular banks of needles adapted to be operated at each reciprocation of said cams, of the fashioning-needles, devices for moving said fashioning-needles independently into and out of operative position, and rotatable and longitudinally-movable rolls adapted to independently actuate said devices to move the needles into and out of operative position, means for rotating and longitudinally moving said rolls, the shifting of said rolls longitudinally dictating the needle-controlling devices to be actuated, and the rotation of said rolls actuating the same.

4. In a straight-knitting machine, the combination with needles, of devices corresponding to the needles and each adapted in its movements to move a corresponding needle into or out of operative position, a pair of rotatable rolls each provided with projections and depressions, means to move said rolls longitudinally to bring projections on said roll into alinement with predetermined needles, to respectively throw them into or out of operative position and means to impart to said rolls a complete revolution after each shifting of the rolls whereby the needles are moved into and out of operation in a predetermined order.

5. In a straight-knitting machine, the combination with the needles, of a pair of rolls extending along the needle-bed, each provided with projections and depressions extending longitudinally of said rolls, means enabling projections on said rolls to actuate needles in alinement therewith, to throw them respectively into and out of operative position, means to move said rolls longitudinally to bring said projections into position to so actuate predetermined needles, and means to rotate said rolls after each shifting thereof whereby the needles are moved into and out of operative position in a predetermined order.

6. In a straight-knitting machine, the combination with the needles, of a pair of rolls extending along the needle-bed each having a plurality of longitudinally-extending needle-actuating projections out of alinement with each other and extending longitudinally of the rolls, the rolls having relatively depressed portions, means enabling projections on said rolls to actuate needles in alinement therewith, to throw them respectively into and out of operative position, means whereby said rolls and the projections thereon are shifted longitudinally to bring them into position to actuate predetermined needles to throw them into and out of operative position, and means to rotate said rolls whereby the needles are thrown into and out of operative position in a predetermined order.

7. In a straight-knitting machine, the combination, with the front and rear banks of needles, of needle-actuating devices for each bank, two pairs of rolls adjacent respectively to the front and rear needles, each roll having projections and depressions, means to move said rolls longitudinally to bring projections on one or the other roll of each pair into alinement with predetermined needles, to throw them respectively into and out of operative position, and means to impart to the rolls of each pair a simultaneous movement of rotation after each shifting thereof, whereby the needles of both banks are moved into and out of operation in a predetermined order.

8. In a straight-knitting machine, the combination with the front and rear banks of needles, of two pairs of rolls adjacent respectively to the front and rear needles, each roll having projections and depressions extending longitudinally thereof, means enabling projections on the two rolls of each pair to actuate needles in alinement therewith, to throw them respectively into and out of operative position, means to move the rolls longitudinally to bring projections on one or the other roll of each pair into position to actuate predetermined needles to throw them respectively into and out of operative position, and means to impart to the rolls of each pair a simultaneous movement of rotation after each shifting thereof, whereby the needles of both banks are moved into and out of operative position in a predetermined order.

9. In a straight-knitting machine, the combination with the front and rear banks of needles, of two pairs of rolls extending respectively longitudinally along and adjacent to the front and rear needles, each roll having a plurality of longitudinally-extending needle-actuating projections out of alinement with each other, and extending longitudinally of said rolls, the rolls having relatively depressed portions, means enabling projections on the two rolls of each pair to actuate needles in alinement therewith to throw them respectively into and out of operative position, means whereby said rolls and the projections thereon are shifted longitudinally to bring them into position to actuate predetermined needles to throw them into and out of operative position, means to impart to the rolls of each pair a simultaneous movement of rotation after each shifting thereof, whereby the needles of both banks are moved into and out of operation in a predetermined order.

10. In a straight-knitting machine, the combination with the front and rear banks of needles, of needle-actuating devices for each bank, two pairs of rolls adjacent respectively to the front and rear needles, each roll having projections and depressions, means to move said rolls longitudinally to bring projections on one or the other roll of each pair into alinement with predetermined needles to throw them respectively into and out of operative position, and means to impart to the rolls of each pair a simultaneous movement of rotation after each shifting thereof, whereby the needles of both banks are moved into and out of operation in a predetermined order, and means on one of the rolls whereby one of the needles of either bank is moved into position to, and caused to, knit with the needles of the other bank while the needles of the corresponding bank are out of operation, substantially as described.

11. In a straight-knitting machine, the combination with the front and rear banks of needles, of needle-actuating devices for each bank, two pairs of rolls adjacent respectively to the front and rear needles, each roll having projections and depressions, means to move said rolls longitudinally to bring projections on one or the other roll of each pair into alinement with predetermined needles, to throw them respectively into and out of operative position, and means to impart to the rolls of each pair a simultaneous movement of rotation after each shifting thereof, whereby the needles of both banks are moved into and out of operation in a predetermined order, one of the projections of one of the rolls of each pair being of different vertical height from the other projections and adapted to shift the device it engages to throw the needle controlled by said device in operative position to knit with the other bank.

12. In a straight-knitting machine, the combination with the front and rear banks of needles, of two pairs of rolls adjacent respectively to the front and rear needles, each roll having projections and depressions extending longitudinally thereof, means enabling projections on the two rolls of each pair to actuate needles in alinement therewith to throw them respectively into and out of operative position, means to move said rolls longitudinally to bring projections on one or the other roll of each pair into position to actuate predetermined needles to throw them respectively into and out of operative position, and means to impart to the rolls of each pair a simultaneous movement of rotation after each shifting thereof, whereby the needles of both banks are moved into and out of operative position in a predetermined order, and means whereby one of the needles of either bank is moved into position to, and caused to, knit with the needles of the other bank while the needles of the corresponding bank are out of operation, substantially as described.

13. In a straight-knitting machine, the combination with the front and rear banks of needles, of two pairs of rolls adjacent respectively to the front and rear needles, each roll having projections and depressions extending longitudinally thereof, means enabling projections on the two rolls of each pair to actuate needles in alinement therewith to throw them respectively into and out of operative position, means to move said rolls longitudinally to bring projections on one or the other roll of each pair into alinement with predetermined needles to throw them respectively into and out of operative position, and means to impart to the rolls of each pair a simultaneous movement of rotation after each shifting thereof, whereby the needles of both banks are moved into and out of operative position in a predetermined order, one of the projections of one of the rolls of each pair being of different vertical height from the other projections and adapted to shift the needle in alinement therewith into operative position to knit with the other bank.

14. In a straight-knitting machine, the combination with the knitting-cams and the regular banks of needles adapted to be operated at each reciprocation of said cams, of additional fashioning-needles on each bank, devices for moving said fashioning-needles independently into and out of operative position, a pair of rotatable and longitudinally-shiftable rolls for each bank of fashioning-needles, means for rotating and shifting the rolls of each pair simultaneously, each roll having a series of longitudinally-extending projections and depressions of varying longitudinal extent, the projections on one roll of a pair registering with the depressions on the other roll of said pair during their rotation, the needle-controlling devices of each bank being in alinement with the projections on one or the other of the corresponding pair of rolls and adapted to be actuated thereby the shifting of said rolls longitudinally dictating the needle-controlling devices to be actuated by the projections on each roll of each pair, the projections on one roll of each pair being adapted during rotation to hold or throw the needles controlled by the needle-controlling devices in alinement therewith into operative position, while the projections on the other roll of each pair are adapted to hold or throw the needles controlled by the needle-controlling devices in alinement therewith out of operative position.

15. In a straight-knitting machine, the combination with two banks of fashioning-needles, and the knitting-cams, of devices for moving said fashioning-needles independently into or out of operative position, a rotatable roll for each bank of fashioning-needles, and projections on said roll, means for rotating said roll, one or more of said devices being in line of movement of one or more of said projections and adapted to be actuated thereby to move or hold said needles in operative position in their respective banks, one of said projections being of greater vertical height than the other projection and adapted to shift the device it engages to throw the needle controlled by said device into operative position to knit with the other bank.

16. In a straight-knitting machine, the combination, with the knitting-cams, and the regular banks of needles adapted to be operated at each reciprocation of said cams, of the fashioning-needles, devices for moving said fashioning-needles independently into and out of operative position, and rotatable and longitudinally-movable rolls provided with projections of varying longitudinal extent adapted to independently actuate said needle-controlling devices to move the needles into and out of operative position, a projection on one or more of the rolls of a different height from the first-mentioned projections and adapted to actuate one of the needle-controlling devices to move its corresponding needle into operative position to knit with the needles of the other bank, means for rotating and longitudinally moving said rolls the shifting of said rolls longitudinally dictating the needle-controlling devices to be actuated, and the rotation of the rolls actuating the same.

17. The combination with the two banks of fashioning-needles, and the knitting-cams, of the pivoted levers 14 adapted to raise and lower the needles into and out of alinement with the knitting-cams, the two pairs of rolls 15, 16 and 17, 18 and longitudinally-extending projections on each roll of each pair in alinement with certain of said levers, the said projections being partially cut away, means for rotating the rolls of each pair simultaneously, the projections on each roll of each pair alining respectively with the projections, and registering respectively with the cut-away portions, on the other roll of said pair, and adapted to independently actuate said levers, and means to shift said rolls longitudinally, whereby different series of needle-levers are acted upon by the said rolls.

18. The combination with the two banks of fashioning-needles, and the knitting-cams, of the pivoted levers 14 adapted to raise and lower the needles out of alinement with the knitting-cams, the two pairs of rolls 15, 16 and 17, 18 and longitudinally-extending projections on each roll of each pair, the said projections being partially cut away, means for rotating the rolls of each pair simultaneously, the projections on each roll of each pair alining respectively with the projections, and registering respectively with the cut-away portions, on the other roll of said pair, the levers 14 on each bank extending between the corresponding pair of rolls the projections on one roll of each pair being adapted to actuate said levers to raise said needles into alinement with the knitting-cams, while the projections on the other roll of said pair are adapted to actuate said levers to depress said needles out of alinement with the knitting-cams, one projection on one roll of each pair being of greater height above the periphery of the roll than the other projections of said roll and adapted to actuate the lever engaged by it to raise the corresponding needle above the point to which the needles engaged by the other projections of said roll are raised, and a cam adapted to coöperate with the needle raised to the greater height.

19. The combination with the two banks of fashioning-needles, of pattern mechanism for the needles, means enabling the pattern mechanism to actuate needles in alinement therewith, a device carried by the pattern mechanism for moving at a predetermined time one of the needles of either bank to a different vertical height from the other needles of said bank, the knitting-cams for each bank, and a cam moving with the knitting-cams of each bank, in line of movement of, and adapted to actuate, the said needle raised to a different height, during the return movement of the corresponding knitting-cams, and during the actuating of the needles of the other bank, whereby said needle is caused to knit with the needles of the other bank.

20. The combination with the needles, of rolls adjacent thereto having projections, means enabling said projections to actuate needles in alinement therewith to throw the same into and out of operative position, a shaft for rotating said rolls, a cam on said shaft having a plurality of peripheral projections, cam-plates adapted to reciprocate longitudinally of the shaft and to alternately engage said cam between said projections to rotate said cam and shaft on their entering movement, and means for reciprocating said cam-plates.

21. The combination with the needles, of rotatable rolls adjacent thereto having projections, means enabling said projections to actuate needles in alinement therewith to throw the same into and out of operative position, a shaft for rotating said rolls, a cam on said shaft having a plurality of peripheral projections, beveled cam-plates on opposite sides of said cam and adapted to reciprocate longitudinally of the shaft, and means for reciprocating said cam-plates in unison, whereby said projections are consecutively engaged by each of said cam-plates alternately to rotate the cam and shaft in their forward movement.

22. The combination with the needles, of rotatable rolls adjacent thereto having projections, means enabling said projections to actuate needles in alinement therewith to throw the same into and out of operative position, a shaft for rotating said rolls, a cam on said shaft having a plurality of peripheral beveled projections, beveled cam-plates on opposite sides of said cam at different radial points and adapted to reciprocate longitudinally of the shaft, means for reciprocating said cam-plates in unison to cause said cam-plates to alternately engage said cam between said projections, whereby said projections are consecutively engaged by each of said cam-plates alternately to rotate the cam and cam-shaft in their forward movement.

23. The combination with the fashioning-needles, of a rod adapted to be reciprocated, mechanism actuated by the reciprocation of said rod to throw said needles into and out of operative position, lugs on said rod, a constantly-reciprocating lug, the pattern mechanism, and means actuated by the pattern mechanism to move said rod and thereby move said lugs into alinement with the constantly-reciprocating lug, whereby said rod is reciprocated.

24. The combination with the needles, of rotatable rolls, adjacent thereto, means enabling said rolls to actuate needles in alinement therewith to throw the same into and out of operative position, a shaft for rotating said rolls, a cam on said shaft having a plurality of projections, beveled cam-plates on opposite sides of said cam, a rod connected with said cam-plates, lugs on said rod, a constantly-reciprocating lug, the pattern mechanism, and means actuated by the pattern mechanism to move said rod and thereby move said lugs into alinement with the constantly-reciprocating lug whereby said rod is reciprocated, and said cam-plates reciprocated in unison to cause said projections to be consecutively engaged by both of said cam-plates alternately.

25. The combination with the needles, of rolls adjacent thereto, means enabling said rolls to actuate needles in alinement therewith to throw the same into and out of operative position, a shaft for rotating said rolls, a cam on said shaft, cam-plates adapted to engage and turn said cam, a rod connected to said cam-plates, a constantly-reciprocated device, the pattern mechanism, and means actuated by the pattern mechanism to move said rod into position to be engaged by the constantly-reciprocating device, whereby said rod and the cam-plates are reciprocated and the cam-plates caused to alternately engage said cam to turn the same and actuate the needle-actuating rolls.

26. The combination with the needles of the needle-controlling rolls adjacent thereto, means enabling said rolls to actuate needles in alinement therewith, a sliding frame in which said rolls are journaled, a shaft for rotating said rolls, a cam on said shaft, and mechanism for sliding said frame longitudinally adapted to be engaged by said cam at a predetermined point in the rotation of said shaft.

27. The combination with the needles, of the needle-controlling rolls adjacent thereto, means enabling said rolls to actuate needles in alinement therewith, a sliding frame in which said rolls are journaled, a rack on said frame, a pawl engaging said rack, a shaft, a cam on said shaft, means for rotating said shaft, and pawl-actuating mechanism adapted to be engaged by said cam at a predetermined point in the rotation of said shaft, whereby the frame is shifted to longitudinally shift said rolls.

28. The combination with the needles, of the needle-controlling rolls, adjacent thereto, means enabling said rolls to actuate needles in alinement therewith, a sliding frame in which said rolls are journaled, a rack on said frame, a pawl engaging said rack, a shaft, a cam on said shaft, means for rotating said shaft, a bar adapted to be engaged by said cam, a bell-crank, one end connected to said bar and the other end to the pawl, whereby at a predetermined point in the rotation of said shaft the said cam engages and shifts said bar, causing the bell-crank to move said pawl to engage said rack and shift said frame and rolls longitudinally.

29. The combination with the needles, of the needle-controlling rolls adjacent thereto, means enabling said rolls to actuate needles in alinement therewith, a sliding frame in which said rolls are journaled, a rack on said frame, a pawl engaging said rack, a shaft, a cam on said shaft, means for rotating said shaft, and pawl-actuating mechanism adapted to be engaged by said cam at a predetermined point in the rotation of said shaft, whereby the frame is shifted to longitudinally shift said rolls, and a holding-pawl for retaining said rack and frame in its shifted position during the disengagement of the shifting-pawl.

30. The combination with the needles, of rolls adjacent thereto, means enabling said rolls to actuate needles in alinement therewith to throw the same into and out of operative position, a cam for rotating said rolls, cam-plates adapted to engage and turn said cam, means for actuating said cam-plates, a sliding frame in which said rolls are journaled, a second cam actuated by the first-named cam, and mechanism for sliding said frame longitudinally adapted to be engaged by the second cam at a predetermined point in its rotation.

31. The combination with the needles, of rolls adjacent thereto, means enabling said rolls to actuate needles in alinement therewith to throw the same into and out of operative position, a cam for rotating said rolls, cam-plates adapted to engage and turn said cam, a rod connected to said cam-plates, a constantly-reciprocated device, the pattern mechanism, means actuated by the pattern mechanism to move said rod into position to be engaged by the constantly-reciprocating device, whereby said rod and the cam-plates are reciprocated and the cam-plates caused to alternately engage said cam to turn the same and the needle-actuating rolls, a sliding frame in which said rolls are journaled, a second cam actuated by the turning of the first-named cam, and mechanism for sliding said frame longitudinally adapted to be engaged by the second cam at a predetermined point in its rotation.

32. The combination with the needles, the needle-controlling rolls, adjacent thereto, means enabling said rolls to actuate needles in alinement therewith, and a sliding frame in which said rolls are journaled, of a constantly-reciprocated device, a rod, the pattern mechanism, means actuated by the pattern mechanism to move said rod into position to be engaged by the constantly-reciprocated device, and roll-turning and roll-frame-shifting mechanism adapted to be actuated by the reciprocation of said rod.

33. The combination with the needles, the needle-controlling rolls adjacent thereto, means enabling said rolls to actuate needles in alinement therewith, and a frame in which said rolls are journaled, of a constantly-reciprocated device, a rod, the pattern mechanism, means actuated by the pattern mechanism to move said rod into position to be engaged by the constantly-reciprocated device, roll-turning mechanism adapted to be actuated by the reciprocation of said rod, and roll-frame-shifting mechanism adapted to be actuated by the roll-turning mechanism.

34. The combination with the needles, of rolls adjacent thereto, means enabling said rolls to actuate needles in alinement therewith to move the same into and out of operative position, means for shifting said rolls longitudinally in one direction to dictate the needles to be moved into and out of operative position, means for turning the rolls to actuate the needles, and mechanism to shift said rolls to their initial positions.

35. The combination, with the needles, of rolls adjacent thereto, means enabling said rolls to actuate needles in alinement therewith to move the same into and out of operative position, a frame in which said rolls are journaled, means for shifting said roll-frame step by step longitudinally in one direction, a spring tending to return said roll-frame to its initial position, holding devices to normally hold said frame in its advanced positions, means for releasing said holding devices to permit said spring to act to return said roll-frame to its initial position.

36. The combination, with the needles, of rolls adjacent thereto, means enabling said rolls to actuate needles in alinement therewith to move the same into and out of operative position, a frame in which said rolls are journaled, means for shifting said roll-frame step by step longitudinally in one direction, a spring tending to return said roll-frame to its initial position, a cam having a cut-away portion and rotated and shifted in unison with said rolls, a lever on the frame of the machine and adapted to engage said cam and hold said rolls from returning until the cut-away portion of said cam is brought into alinement with said lever by the rotation of said cam.

37. The combination, with the needles, of rolls adjacent thereto, means enabling said rolls to actuate needles in alinement therewith to move the same into and out of operative position, a frame in which said rolls are journaled, a rack on said frame, a pawl engaging said rack to shift said roll-frame step by step longitudinally, a holding-pawl engaging said rack, means for actuating said shifting-pawl, a spring tending to return said roll-frame to its initial position, means for throwing said pawls out of engagement, a cam having a cut-away portion and rotated and shifted in unison with said rolls and a lever on the frame of the machine adapted to engage said cam and hold said rolls from returning during the disengagement of said pawls and until the cut-away portion of said cam is brought into alinement with said lever by the rotation of said cam.

38. The combination with the needles, of rolls adjacent thereto, means enabling said rolls to actuate needles in alinement therewith to move the same into and out of operative position, a frame in which said rolls are journaled, a rack on said frame, a pawl engaging said rack to shift said roll-frame step by step longitudinally, a holding-pawl, engaging said rack, means for actuating said shifting-pawl, a spring tending to return said roll-frame to its initial position, means for throwing said pawls out of engagement, and means for holding said roll-frame from returning after said pawls are disengaged and until said rolls have completed a predetermined movement of rotation.

39. The combination with the needles and the needle-actuating rolls adjacent thereto enabling said rolls to actuate needles in alinement therewith, of a constantly-reciprocating device, roll-turning and roll-shifting mechanism, the pattern mechanism, means actuated by the pattern mechanism to throw said roll-turning and roll-shifting mechanism into engagement with the constantly-reciprocated device, and means actuated by the pattern mechanism to throw said roll-shifting mechanism out of operation.

40. The combination with the needles and the needle-actuating rolls adjacent thereto means enabling said rolls to actuate needles in alinement therewith, of a constantly-reciprocating device, roll-turning and roll-shifting mechanism, the pattern mechanism, means actuated by the pattern mechanism, to throw said roll-turning and roll-shifting mechanism into engagement with the constantly-reciprocated device, and means actuated by the pattern mechanism to throw said roll-shifting mechanism out of operation, means tending to shift said rolls back to their initial position, and holding devices adapted to hold said rolls from returning after the throwing out of operation of the roll-shifting mechanism and until the roll-turning mechanism has imparted to said rolls a predetermined movement of rotation.

41. The combination, with the needles, of mechanism for moving the same into and out of operative position, a rod adapted to be reciprocated to actuate said mechanism, a constantly-reciprocated device, a cam engaging said rod, a ratchet for rotating said cam, a pawl adapted to be reciprocated and to engage said ratchet, a guard-lever adapted to guard said pawl from engaging said ratchet, and pattern mechanism adapted to move said guard-lever to permit said pawl to actuate said ratchet and rotate said cam, and move said rod into position to be engaged by the constantly-reciprocated device.

42. The combination, with the needles, of mechanism for moving the same into and out of operative position, a rod adapted to be reciprocated to actuate said mechanism, a constantly-reciprocated device, a cam engaging said rod, a ratchet for rotating said cam, one of the teeth of said ratchet being out of alinement with the other teeth thereof, a reciprocating pawl, a guard-lever located in such relation to the cam as to guard said pawl from engaging the first-named tooth only, and pattern mechanism adapted to control and move said guard-lever to permit said pawl to engage said tooth, whereupon said pawl will engage all the teeth of said ratchet successively, rotating said cam, moving said rod, and holding said rod in position to be engaged by the constantly-reciprocated device until after said pattern mechanism has returned said guard-lever and until said ratchet and cam have been returned to their initial position.

43. The combination, with the needles, of the rolls adjacent thereto, means enabling said rolls to actuate needles in alinement therewith to throw the same into and out of operative position, the roll-turning mechanism, mechanism for shifting the rolls forwardly step by step, devices for rendering the roll-shifting mechanism inoperative, and a pattern-drum, adapted to engage and throw said roll-shifting and roll-turning mechanism into operation and to engage and actuate said devices.

44. The combination, with the needles, of the rolls adjacent thereto, means enabling said rolls to actuate needles in alinement therewith to throw the same into and out of operative position, the roll-turning mechanism, mechanism for shifting the rolls forwardly step by step, devices for disengaging the roll-shifting mechanism from the rolls, a pattern-drum adapted to engage and throw said roll-shifting and roll-turning mechanism into operation and to engage and actuate said roll-shifting disengaging devices, means for shifting back the rolls after the disengagement therefrom of the roll-shifting devices and holding devices acting to restrain the rolls from shifting back until the roll-turning mechanism has imparted to said rolls a predetermined movement of rotation.

45. In a pattern mechanism for knitting-machines, the combination with the pattern-chain, of a ratchet for advancing the pattern-chain, a pawl-carrying device, a pawl carried thereby engaging said ratchet, means for constantly reciprocating said pawl-carrying device, a pattern-drum, a ratchet for turning said drum, said ratchet having alternate long and short teeth, a second pawl on the pawl-carrying device normally playing on a long tooth of said drum-ratchet, a third pawl normally resting on a short tooth of said drum-ratchet, a second pawl-carrying device carrying said third pawl and in line of travel of the pattern-chain, whereby the advancement of said chain actuates said second pawl-carrying device and the pawl carried thereby to turn the pattern-drum, to enable the second pawl on the first-named pawl-carrying device to engage said long tooth and further advance the drum.

46. In a pattern mechanism for knitting-machines, the combination, with the pattern-chain, of a ratchet for advancing the pattern-chain, a pawl 67 engaging said ratchet, a rocking lever 65 carrying said pawl, a rocking lever 61 connected to and actuating the rocking lever 65, means for constantly reciprocating the rocking lever 61, the pattern-drum, a ratchet for turning said drum having alternate long and short teeth, a pawl 74 carried by the rocking lever 61 and normally playing on a long tooth of said drum-ratchet, a bell-crank, one arm of which is in line of travel of the pattern-chain, a pawl 75 carried by the other arm of said bell-crank and normally resting on a short tooth of said drum-ratchet, whereby the advancement of said pattern-chain turns said bell-crank, engages pawl 75 with the drum-ratchet to turn the drum-ratchet and drum and moves the long tooth adjacent to pawl 74 into position to be engaged by the pawl 74 in its next reciprocation to further turn said drum-ratchet and drum.

47. The combination, with the pattern-chain of a pattern-drum, pins on said drum, the needles, mechanism for throwing said needles into and out of operative position, a device normally engaging one of said pins and holding said mechanism out of action, devices for rotating said drum, a pattern-chain for engaging and actuating said devices, whereby the travel of said chain rotates said drum, draws said pin out of engagement with said device, permitting said device to drop and permit the needle-controlling mechanism to operate.

48. The combination, with the needles, mechanism for throwing said needles into and out of operative position a pattern-drum, a series of pins on said drum, a device normally resting upon one of said pins and holding said mechanism out of action, means for imparting to said drum intermittently a definite movement of rotation, thereby first drawing said pin out of engagement with said device, allowing said device to drop and permit the needle-controlling mechanism to operate, and then lifting said device over the next pin in the series to again hold said mechanism out of operation.

49. The combination with the needles, mechanism for throwing said needles into and out of operative position, a pattern-drum, a series of pins on said drum, a device normally resting upon one of said pins and holding said mechanism out of action, means for imparting to said drum intermittently a definite movement of rotation, thereby first drawing said pin out of engagement with said device, allowing said device to drop and permit the needle-controlling mechanism to operate and then shifting said device over the next pin in the series to again hold said mechanism out of operation, there being a space unprovided with pins beyond the last pin of said series, to retain said device in its dropped position to permit said mechanism to operate continuously until the drum is given a further definite movement of rotation, and a pin beyond said space for again raising said device to again hold said mechanism out of action.

50. The combination, with the needles, mechanism for throwing said needles into and out of operative position, a pattern-drum, a series of pins on said drum, a device normally resting upon one of said pins and holding said mechanism out of action, means for imparting to said drum intermittently a definite movement of rotation, thereby first drawing said pin out of engagement with said device, allowing said device to drop and permit the needle-controlling mechanism to operate, and then lifting said device over the next pin in the series to again hold said mechanism out of operation, there being a space unprovided with pins beyond the last pin of said series, to retain said device in its dropped position to permit said mechanism to operate continuously until the drum is given a further definite movement of rotation, and a pin beyond said space for again raising said device to again hold said mechanism out of action, and a series of pins relatively close together adapted to continuously hold said device in its raised position during a further definite movement of rotation of the drum.

51. The combination with the needles, mechanism for throwing said needles into and out of operative position, a pattern-drum, a series of pins on said drum, a device normally resting upon one of said pins, and holding said mechanism out of action, means for imparting to said drum intermittently a definite movement of rotation, thereby first drawing said pin out of engagement with said device, allowing said device to drop and permit the needle-controlling mechanism to operate, and then lifting said device over the next pin in the series to again hold said mechanism out of operation, and a series of pins relatively close together adapted to raise and continuously hold said device in its raised position during a definite movement of rotation of the drum.

52. The combination, with the needles, of mechanism for moving the same into and out of operative position, a rod adapted to be reciprocated to actuate said mechanism, a constantly-reciprocated device, a cam engaging said rod, a ratchet for rotating said cam, a pawl adapted to be reciprocated to engage said ratchet, a guard-lever adapted to guard said pawl from engaging said ratchet, a pattern-drum provided with pins adapted to engage and disengage said guard-lever and move said guard-lever to permit said pawl to actuate said ratchet, rotate said cam, and move said rod into position to be engaged by the constantly-reciprocated device, and means to rotate said drum.

53. The combination, with the pattern-drum, the needles, the rolls for moving the needles into and out of operative position, a frame in which the rolls are journaled a ratchet on said frame, pawls for shifting said frame longitudinally step by step in one direction and for holding said frame in its shifted position, mechanism controlled by the pattern-drum for actuating said pawls, devices controlled by the pattern device for disengaging said pawls from the rack, and a device carried by the pattern-drum to actuate said pawl-disengaging devices at a predetermined point in the rotation of said drum, means for returning the roll-frame to its initial position after the disengagement of said pawls, and means for rotating said pattern-drum.

54. The combination, with the pattern-drum, the needles, the rolls for moving the needles into and out of operative position, a frame in which the rolls are journaled, a ratchet on said frame, pawls for shifting said frame longitudinally step by step in one direction and for holding said frame in its shifted position, a bar carrying said pawls, a lever connected to said bar, a shaft on which said lever is pivoted, a crank on said shaft, a roller on said crank, a cam on said drum in alinement with said roller and adapted at a predetermined point in the rotation of said drum to engage said roller, and thereby operate said crank, shaft, and lever to move said bar and disengage said pawls from said rack, means for returning the roll-frame to its initial position after the disengagement of said pawls, and means for rotating said drum.

55. The combination, with the ratchet 54 having a plurality of teeth, one of which is at a lower radial height than the others, the cam 51 actuated by the ratchet, the pawl 56, means for constantly reciprocating the pawl, the guard-lever 60 engaged by said pawl and preventing the pawl from engaging the tooth of lower radial height, and means for moving said guard-lever out of engagement to permit the pawl to engage said ratchet and turn said cam, a rod engaged by said cam, needle controlling and actuating mechanism connected with said rod, and constantly-operated means engaging and actuating said rod when the same is lifted by the turning of said cam.

In testimony of which invention I have hereunto set my hand, at Philadelphia, Pennsylvania, on this 10th day of March, 1900.

HARRY A. HOUSEMAN.

Witnesses:
M. F. ELLIS,
J. M. SHINDLER, Jr.